(12) United States Patent
Takata et al.

(10) Patent No.: US 11,492,920 B2
(45) Date of Patent: Nov. 8, 2022

(54) STEAM TURBINE

(71) Applicant: Mitsubishi Hitachi Power Systems, Ltd., Yokohama (JP)

(72) Inventors: Ryo Takata, Tokyo (JP); Mitsuyoshi Tsuchiya, Yokohama (JP); Yasuhiro Sasao, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 31 days.

(21) Appl. No.: 16/461,148

(22) PCT Filed: Jan. 17, 2018

(86) PCT No.: PCT/JP2018/001092
§ 371 (c)(1),
(2) Date: May 15, 2019

(87) PCT Pub. No.: WO2018/147013
PCT Pub. Date: Aug. 16, 2018

(65) Prior Publication Data
US 2020/0072068 A1    Mar. 5, 2020

(30) Foreign Application Priority Data
Feb. 10, 2017   (JP) .............................. JP2017-022698

(51) Int. Cl.
*F01D 11/04*  (2006.01)
*F01D 25/10*  (2006.01)
(Continued)

(52) U.S. Cl.
CPC .............. *F01D 11/04* (2013.01); *F01D 9/065* (2013.01); *F01D 25/10* (2013.01); *F01D 9/02* (2013.01);
(Continued)

(58) Field of Classification Search
CPC ... F01D 5/08; F01D 5/082; F01D 9/02; F01D 9/04; F01D 9/065; F01D 11/04;
(Continued)

(56) References Cited

U.S. PATENT DOCUMENTS 2,332,322 A *  10/1943  Kraft .............................. 415/115
3,724,967 A    4/1973  Fischer
(Continued)

FOREIGN PATENT DOCUMENTS

CN   105637200 A   6/2016
CN   110114555 A   8/2019
(Continued)

OTHER PUBLICATIONS

Machine translation of JP H09195705 (Year: 1997).*
(Continued)

*Primary Examiner* — Christopher R Legendre
(74) *Attorney, Agent, or Firm* — WHDA, LLP

(57) ABSTRACT

A steam turbine includes a rotor; a casing which houses the rotor; a plurality of rotor blades disposed around the rotor; and a plurality of stationary vanes supported on the casing. The stationary vane includes a vane body portion and an inner race positioned on an inner side of the vane body portion in a radial direction of the rotor. The stationary vanes include a first stationary vane having a through hole formed through the vane body portion. The rotor has a cavity having a concave shape and being formed such that at least a part of the inner race of the first stationary vane is housed in the cavity. The steam turbine includes a steam passage to discharge steam extracted from a space upstream of the first stationary vane in the casing to the cavity from the inner race through the through hole of the first stationary vane.

7 Claims, 9 Drawing Sheets

(51) Int. Cl.
*F01D 9/06* (2006.01)
*F01D 9/02* (2006.01)
*F01D 25/24* (2006.01)
*F16J 15/447* (2006.01)

(52) U.S. Cl.
CPC .......... *F01D 25/24* (2013.01); *F05D 2220/31* (2013.01); *F05D 2240/12* (2013.01); *F16J 15/447* (2013.01)

(58) Field of Classification Search
CPC ...... F01D 25/10; F01D 25/24; F05D 2220/31; F05D 2240/12; F05D 2260/20; F05D 2260/2322
See application file for complete search history.

(56) References Cited

U.S. PATENT DOCUMENTS

| | | | |
|---|---|---|---|
| 3,945,758 A * | 3/1976 | Lee | F01D 5/187 415/115 |
| 6,217,279 B1 | 4/2001 | Ai et al. | |
| 6,272,861 B1 * | 8/2001 | Bergmann | F01K 7/226 60/657 |
| 7,134,841 B2 * | 11/2006 | Montgomery | F01D 5/081 416/91 |
| 8,393,861 B2 * | 3/2013 | Wada | C23C 28/324 415/200 |
| 8,979,480 B2 * | 3/2015 | Inomata | F01D 11/001 415/115 |
| 2004/0253100 A1 * | 12/2004 | Blatchford | F01D 11/001 415/208.1 |
| 2012/0251304 A1 | 10/2012 | Maruyama | |
| 2016/0208631 A1 | 7/2016 | Spangler | |
| 2016/0251981 A1 | 9/2016 | Hashimoto | |
| 2020/0063561 A1 | 2/2020 | Takata et al. | |
| 2020/0072068 A1 * | 3/2020 | Takata | F01D 25/00 |

FOREIGN PATENT DOCUMENTS

| | | | | |
|---|---|---|---|---|
| JP | 55-40237 | A | 3/1980 | |
| JP | 57-33202 | U | 2/1982 | |
| JP | 57179304 | A * | 11/1982 | |
| JP | 58202301 | A * | 11/1983 | |
| JP | S59-39902 | A | 3/1984 | |
| JP | 60206905 | A * | 10/1985 | ............ F01D 25/10 |
| JP | 63-230904 | A | 9/1988 | |
| JP | 06200704 | A * | 7/1994 | |
| JP | 9-195705 | A | 7/1997 | |
| JP | 3617212 | B2 | 2/2005 | |
| JP | 2005113696 | A * | 4/2005 | ............ F01D 25/32 |
| JP | 2005-299680 | A | 10/2005 | |
| JP | 5055451 | B1 | 10/2012 | |
| SU | 996735 | A2 | 2/1983 | |

OTHER PUBLICATIONS

Machine translation of JP S63230904 (Year: 1988).*
International Search Report dated Mar. 6, 2018, issued in counterpart International Application No. PCT/JP2017/045430 (2 pages).
Office Action dated Aug. 10, 2020, issued in counterpart KR Application No. 10-2019-7018466, with English translation (7 pages).
Office Action dated Nov. 17, 2020, issued in counterpart IN application No. 201917025729, with English Translation. (6 pages).
Office Action dated Feb. 26, 2021, issued in counterpart CN Application No. 201880005232.2 (5 pages).
Office Action dated Feb. 9, 2022, issued in counterpart DE application No. 11 2018 000 772.3. (8 pages).

* cited by examiner

STEAM TURBINE

TECHNICAL FIELD

The present disclosure relates to a steam turbine.

BACKGROUND ART

The wetness fraction tends to increase in the vicinity of the final stage of the steam turbine. For instance, at the final stage of a geothermal turbine or a nuclear high-pressure turbine, the wetness fraction is approximately 15%. In a wet steam region where the wetness fraction is high, liquid drops adhering to the vane surfaces of the turbine separate downstream and collide with downstream vanes. Thus, erosion and moisture loss become problems.

To address such problems, Patent Document 1 discloses a steam turbine that allows high-temperature steam to pass through the insides of stationary vanes positioned in front of low-pressure rotor blades that operate in the wet steam region to heat the stationary vanes, so as to prevent generation of liquid drops on the surfaces of the stationary vanes.

CITATION LIST

Patent Literature

Patent Document 1: JP3617212B

SUMMARY

Problems to be Solved

The steam turbine described in Patent Document 1 is configured such that high-temperature steam after passing through the insides of the stationary vanes is discharged toward the tip ends of the downstream rotor blades, and thus a great loss is caused due to interference between main flow passing through each stage and high-temperature steam discharged after passing through the insides of the stationary vanes, an is likely to cause efficiency degradation of the steam turbine.

At least one embodiment of the present invention was made in view of the above typical problem. An object of at least one embodiment of the present invention is to provide a steam turbine capable of suppressing erosion and efficiency degradation.

Solution to the Problems (1) According to at least one embodiment of the present invention, a steam turbine includes: a rotor; a casing which houses the rotor; a plurality of rotor blades disposed around the rotor; and a plurality of stationary vanes supported on the casing. The stationary vane includes a vane body portion and an inner race positioned on an inner side of the vane body portion in a radial direction of the rotor. The plurality of stationary vanes include a first stationary vane having a through hole formed through the vane body portion in the radial direction. The rotor has a cavity having a concave shape and being formed such that at least a part of the inner race of the first stationary vane is housed in the cavity. The steam turbine includes a steam passage configured to discharge steam extracted from a space upstream of the first stationary vane in the casing to the cavity from the inner race through the through hole of the first stationary vane.

With the above described steam turbine (1), the temperature of steam extracted from the space upstream of the first stationary vane is higher than the temperature of the first stationary vane, and thus it is possible to heat the first stationary vane easily by allowing the steam to flow through the through hole of the first stationary vane. Accordingly, it is possible to suppress generation of liquid drops on the surface of the first stationary vane and suppress erosion.

Further, as steam having passed through the through hole of the first stationary vane is discharged into the cavity from the inner race of the first stationary vane, compared to the configuration of Patent Document 1 (where steam having passed through the inside of the stationary vane is discharged toward the tips of the rotor blades), it is possible to reduce loss due to interference between main flow flowing through the casing (steam flow in the axial direction alternately passing through the stationary vane and the rotor blade) and steam discharged through the through hole, and suppress efficiency degradation of the steam turbine.

Further, it is possible to reduce leakage steam (leak flow from the mainstream) flowing into the cavity from the upstream side of the first stationary vane, and thus it is possible to reduce loss due to the leakage steam, and suppress efficiency degradation of the steam turbine.

(2) In some embodiments, in the above steam turbine (1), the first stationary vane is disposed in a region where a wetness fraction is not lower than 3%.

With the above steam turbine (2), erosion is likely to occur in such a region where the wetness fraction is high. Thus, by heating the first stationary vane disposed in a region where the wetness fraction is high with steam to be supplied to the through hole, it is possible to suppress generation of liquid drops on the surface of the first stationary vane, and suppress erosion effectively.

(3) In some embodiments, in the above steam turbine (2), the first stationary vane is disposed in a region where the wetness fraction is not lower than 10%.

With the above steam turbine (3), erosion is likely to occur in such a region where the wetness fraction is high. Thus, by heating the first stationary vane disposed in a region where the wetness fraction is high with steam to be supplied to the through hole, it is possible to suppress generation of liquid drops on the surface of the first stationary vane, and suppress erosion effectively.

(4) In some embodiments, in the steam turbine according to any one of the above (1) to (3), the casing includes a tip section portion facing a space between a first-stage rotor blade of the plurality of rotor blades and a second-stage stationary vane of the plurality of stationary vanes, and a steam inlet of the steam passage is disposed on the tip section portion.

With the above described steam turbine (4), it is possible to introduce steam having a higher temperature and a higher pressure into the steam passage by locating the steam inlet of the steam passage toward upstream in the casing. Thus, for heating the first stationary vane, it is preferable to locate the steam inlet of the steam passage as upstream as possible. However, for the cleanness of the steam introduced into the steam passage, it is preferable to introduce steam after passing through the first-stage stationary vane to the steam passage.

Thus, as described above, by providing the steam inlet of the steam passage on the tip section portion facing the space between the first-stage rotor blade and the second-stage stationary vane, it is possible to introduce steam having a relatively higher cleanness into the steam passage and heat the first stationary vane effectively.

Further, high-temperature drain generated from condensation of steam is likely to accumulate in the tip section portion, but this drain has not been utilized effectively. In this regard, by providing the steam inlet at the tip section portion as described above, it is possible to introduce not only steam from the space but also high-temperature drain accumulated in the tip section portion into the steam passage, and utilize the drain to heat the first stationary vane, and thus it is possible to heat the first stationary vane effectively.

(5) In some embodiments, in the steam turbine according to any one of the above (1) to (3), the stationary vane includes an outer race supporting the vane body portion. The steam passage has a steam inlet disposed on an upstream surface of the outer race of the first stationary vane, and a steam outlet disposed on a downstream surface of the inner race of the first stationary vane.

With the above described steam turbine (5), the temperature of steam extracted from the space facing the upstream side of the outer race of the first stationary vane is higher than the temperature of the first stationary vane, and thus it is possible to heat the first stationary vane easily by allowing the steam to flow through the through hole of the first stationary vane. Thus, it is possible to achieve the effect described in the above (1) (suppression of erosion and suppression of efficiency deterioration) through a simple configuration.

(6) In some embodiments, the steam turbine according to any one of the above (1) to (3) includes a seal portion disposed in a gap between the rotor and the casing so as to seal leakage steam that flows inward in the radial direction from a gap between a first-stage stationary vane of the plurality of stationary vanes and a first-stage rotor blade of the plurality of rotor blades. The first-stage stationary vane includes a through hole formed through in the radial direction. A steam inlet of the steam passage is configured to take in a part of the leakage steam. The steam passage is configured to supply a part of the leakage steam into the cavity via the through hole of the first-stage stationary vane and the through hole of the first stationary vane.

With the above steam turbine (6), it is possible to heat the first stationary vane effectively by introducing into the steam passage a part of high-temperature and high-pressure leakage steam flowing out inward in the radial direction from a gap between the first-stage stationary vane and the first-stage rotor blade, and supplying the leakage steam into the cavity through the through hole of the first stationary vane. Accordingly, it is possible to suppress generation of liquid drops on the surface of the first stationary vane and suppress erosion effectively.

(7) In some embodiments, in the steam turbine according to any one of the above (1) to (6), the plurality of rotor blades include a first rotor blade disposed adjacent to and downstream of the first stationary vane in an axial direction of the rotor, the rotor includes a first disc portion to which the first rotor blade is fixed, the first disc portion has a balance hole formed through the first disc portion in the axial direction, and the balance hole is configured such that a part of the steam discharged to the cavity from the inner race through the through hole of the first stationary vane flows into the balance hole.

With the above described steam turbine (7), the sum of the flow rate of the leakage steam passing through the inner race seal portion disposed on the radially inner end of the inner race, the flow rate of leakage steam flowing into the cavity from the gap between the first stationary vane and the first rotor blade, and the flow rate of heating steam discharged into the cavity from the inner race of the first stationary vane is equal to the flow rate of steam flowing through the balance hole. With this configuration, it is possible to reduce leak loss in the vicinity of the blade root portion of the first rotor blade.

Advantageous Effects

According to at least one embodiment of the present invention, provided is a steam turbine whereby it is possible to suppress erosion and efficiency degradation.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
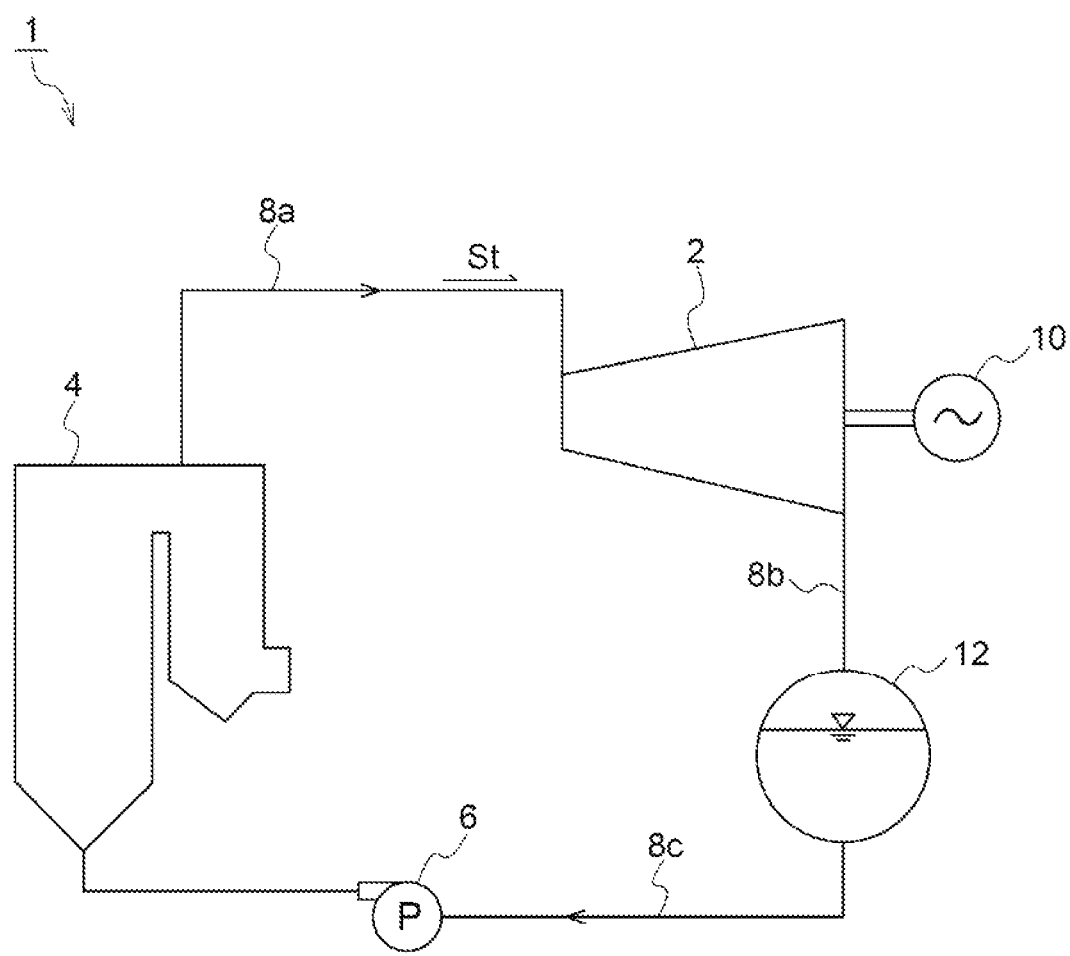
FIG. 1 is an overall configuration diagram of a steam turbine plant including a steam turbine device 2 according to an embodiment of the present invention.

FIG. 1 is an overall configuration diagram of a steam turbine plant including a steam turbine according to an embodiment of the present invention. In FIG. 1, the steam turbine plant 1 includes a steam turbine device 2, a boiler 4, a water supply pump 6, a generator 10, and a condenser 12.

In the steam turbine plant 1 depicted in FIG. 1, steam St generated in the boiler 4 is supplied to the steam turbine device 2 via a steam supply pipe 8a. The steam St supplied to the steam turbine device 2 is supplied to the condenser 12 via a condensate supply pipe 8b after driving the steam turbine device 2. Further, the condensate water condensed in the condenser 12 is pressurized by the water supply pump 6, and thereby supplied to the boiler 4 as boiler water, via a boiler-water supply pipe 8c.

Figure 2:
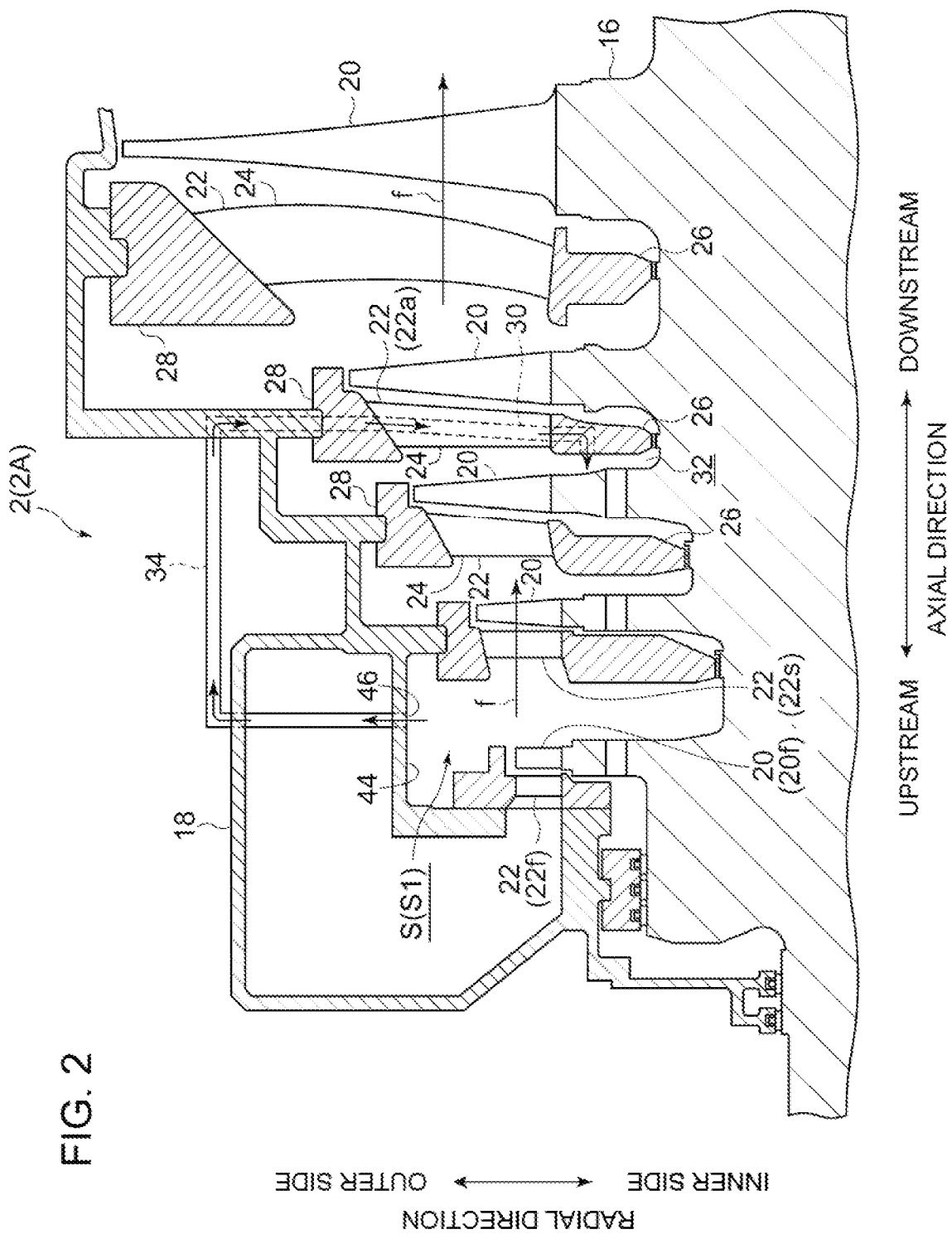
FIG. 2 is a cross-sectional view of a schematic configuration of the steam turbine device 2 (2A) according to an embodiment.

FIG. 2 is a cross-sectional view of a schematic configuration of the steam turbine device 2 (2A) according to an embodiment.

As depicted in FIG. 2, the steam turbine device 2 includes a rotor 16, a casing 18 housing the rotor 16, a plurality of rotor blades 20 disposed around the rotor 16, and a plurality of stationary vanes 22 supported on the casing 18.

Hereinafter, unless otherwise stated, the radial direction of the rotor 16 is referred to as merely "radial direction", and the axial direction of the rotor 16 is referred to as merely "axial direction", and the circumferential direction of the rotor 16 is referred to as merely "circumferential direction". Further, unless otherwise stated, the upstream side and the downstream side in the flow direction of main flow 'f' flowing through the casing 18 (steam flow in the axial direction alternately passing through the stationary vanes 22 and the rotor blades 20) are referred to as merely "upstream" and "downstream" respectively.

Each of the stationary vanes 22 includes a vane body portion 24, an inner race 26 (partition plate portion) positioned inside the vane body portion 24 in the radial direction, and an outer race 28 positioned on the outer side of the vane body portion 24 in the radial direction. At the first-stage stationary vane 22f of the plurality of stationary vanes 22, the inner race 26 and the outer race 28 are coupled to the casing 18. At the stationary vanes 22 other than the first-stage stationary vane 22f of the plurality of stationary vanes 22, only the outer race 28 is joined to the casing 18. Further, the plurality of stationary vanes 22 include a first stationary vane 22a having a through hole 30 formed through the vane body portion 24 in the radial direction. In a depicted illustrative embodiment, of the steam turbine device 2 having five stages, the stationary vane 22 of the fourth stage is the first stationary vane 22a.

The rotor 16 has a cavity 32 having a concave shape formed such that at least a part of the inner race 26 of the first stationary vane 22a is housed in the cavity 32. Further, the steam turbine device 2 includes a steam passage 34 configured to discharge steam extracted from the space S upstream of the first stationary vane 22a in the casing 18 into the cavity 32 from the inner race 26 of the first stationary vane 22a through the through hole 30 of the first stationary vane 22a.

With the above configuration, the temperature of steam extracted from the space S upstream of the first stationary vane 22a is higher than the temperature of the first stationary vane 22a, and thus it is possible to heat the first stationary vane 22a easily by allowing the steam to flow through the through hole 30 of the first stationary vane 22a. Accordingly, it is possible to suppress generation of liquid drops on the surface of the first stationary vane 22a and suppress erosion.

Further, as steam having passed through the through hole 30 of the first stationary vane 22a is discharged into the cavity 32 from the inner race 26 of the first stationary vane 22a, compared to the configuration of Patent Document 1 (where steam having passed through the inside of the stationary vane is discharged toward the tips of the downstream rotor blades), it is possible to reduce loss due to interference between main flow 'f' flowing through the casing 18 (steam flow in the axial direction alternately passing through the stationary vane 22 and the rotor blade 20) and steam discharged through the through hole 30, and suppress efficiency degradation of the steam turbine device 2.

Further, it is possible to reduce leakage steam (leak flow from the mainstream f) flowing into the cavity 32 from the upstream side of the first stationary vane 22a, and thus it is possible to reduce loss due to the leakage steam, and suppress efficiency degradation of the steam turbine device 2.

Figure 3:
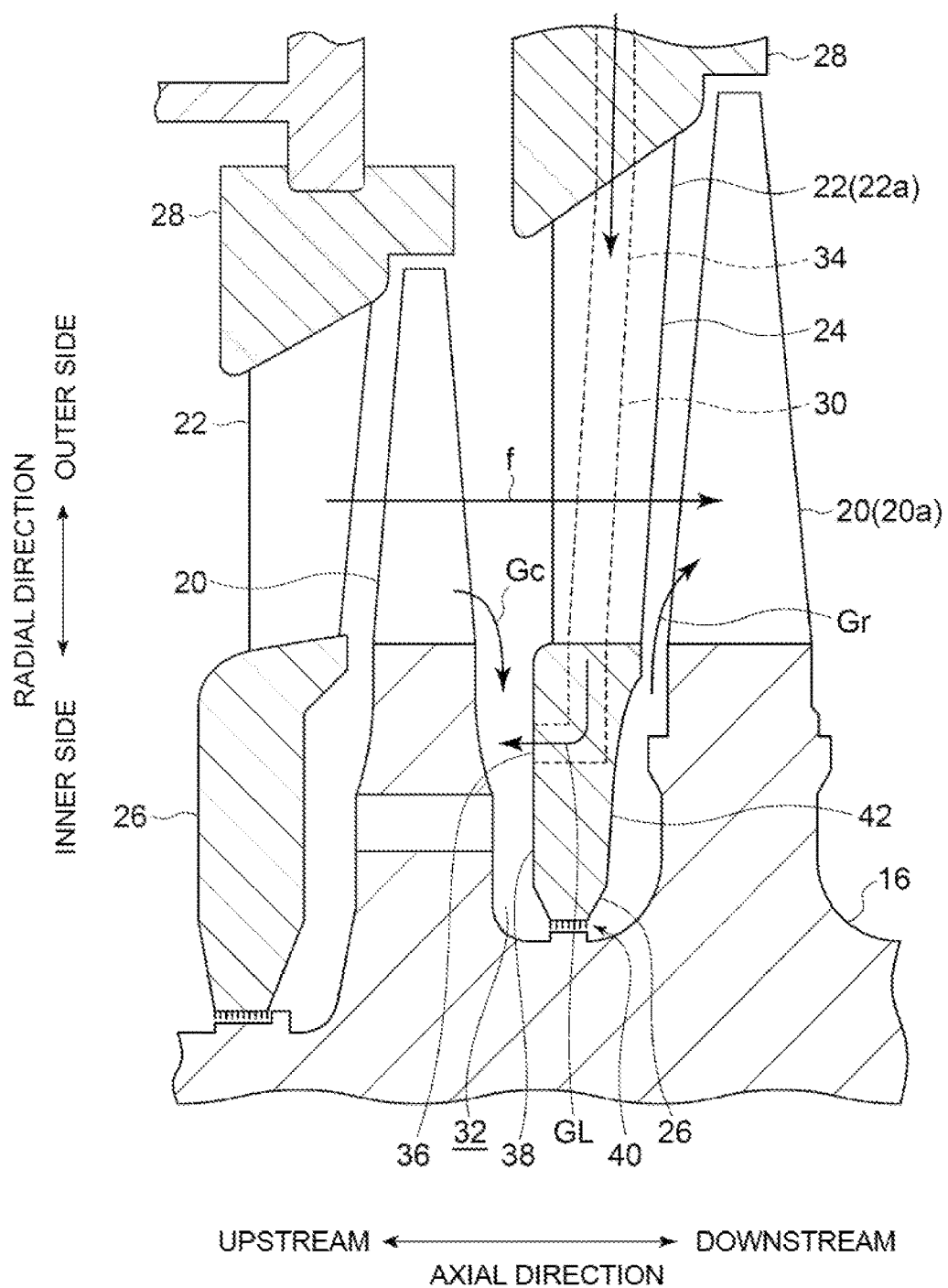
FIG. 3 is a partial enlarged view of the steam turbine device 2 (2A) depicted in FIG. 2.

This point will be described with reference to FIG. 3. In FIG. 3, the arrow Gc indicates the flow of leakage steam flowing into the cavity 32 from the upstream side of the first stationary vane 22a (leakage flow from the main flow 'f'), the arrow Gr indicates the flow of leakage steam that flows outward in the radial direction from the cavity 32 at the downstream of the first stationary vane 22a and interferes with the main flow 'f', and the arrow GL indicates steam discharged to the cavity 32 from the inner race 26 of the first stationary vane 22a (hereinafter, also referred to as "heating steam").

Herein, the flow rate of leakage steam Gr is equal to the sum of the flow rate of the leakage steam Gc and the flow rate of the heating steam GL, and the flow rate of the leakage steam Gr does not change substantially due to presence or absence of the heating steam GL. Thus, by introducing the heating steam GL into the cavity 32, it is possible to suppress the leakage steam Gc from the main flow 'f'. Thus, it is possible to reduce loss due to the leakage steam Gc.

Figure 4:
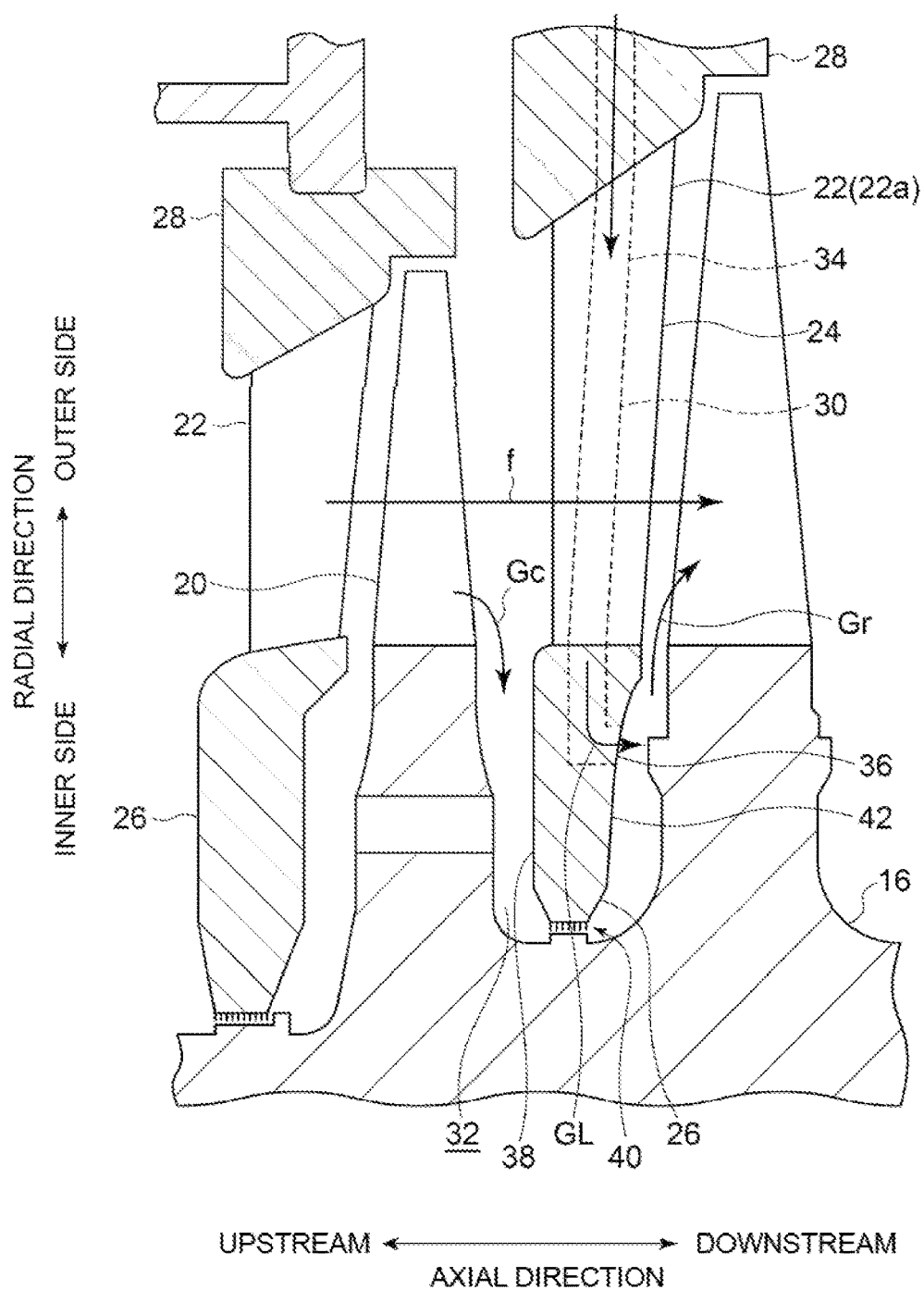
FIG. 4 is a partial enlarged view of a modified example of the steam turbine device 2 (2A) depicted in FIG. 2.

Further, the steam outlet 36 of the steam passage 34 may be disposed on a surface 38 upstream of the inner race 26 of the first stationary vane 22a (surface upstream of the inner race seal portion 40 disposed on the radially inner end of the inner race 26) as depicted in FIG. 3, or may be disposed on the downstream surface 42 of the inner race 26 of the first stationary vane 22a (surface downstream of the inner race seal portion 40 disposed on the radially inner end of the inner race 26). In any of the configurations in FIGS. 3 and 4, it is possible to achieve the effect to suppress the above described leakage steam Gc.

In an embodiment, the first stationary vane 22a is disposed in a region where the wetness fraction is 3% or more (more suitably, 10% or more). Erosion is likely to occur in such a region where the wetness fraction is high. Thus, by heating the first stationary vane 22a disposed in a region where the wetness fraction is high with steam to be supplied to the through hole 30, it is possible to suppress generation of liquid drops on the surface of the first stationary vane 22a, and suppress erosion effectively.

In an embodiment, as depicted in FIG. 2, the casing 18 includes a tip section portion 44 (of the casing 18, a portion surrounding the space S1) facing the space S1 between the first-stage rotor blade 20f of the plurality of rotor blades 20 and the second-stage stationary vane 22s of the plurality of stationary vanes 22, and the steam inlet 46 of the steam passage 34 is disposed on the tip section portion 44.

It is possible to introduce high-pressure and high-temperature steam into the steam passage 34 by locating the steam inlet 46 of the steam passage 34 toward upstream in the casing 18. Thus, for heating the first stationary vane 22a, it is preferable to locate the steam inlet 46 of the steam passage 34 as upstream as possible. However, for the cleanness of the steam introduced into the steam passage 34, it is preferable to introduce steam after passing through the first-stage stationary vane 22f to the steam passage 34.

Thus, as described above, by providing the steam inlet 46 of the steam passage 34 on the tip section portion 44 facing the space S1 between the first-stage rotor blade 20f and the second-stage stationary vane 22s, it is possible to introduce high-pressure and high-temperature steam having a relatively higher cleanness into the steam passage 34 without using a pump or the like and heat the first stationary vane 22a effectively.

Further, high-temperature drain generated from condensation of steam is likely to accumulate in the tip section portion 44, and this drain has not been utilized effectively. In this regard, by providing the steam inlet 46 at the tip section portion 44, it is possible to introduce not only steam from the space S1 but also high-temperature drain accumulating the tip section portion 44 into the steam passage 34, and utilize the drain to heat the first stationary vane 22a, and thus it is possible to heat the first stationary vane 22a effectively.

Figure 5:
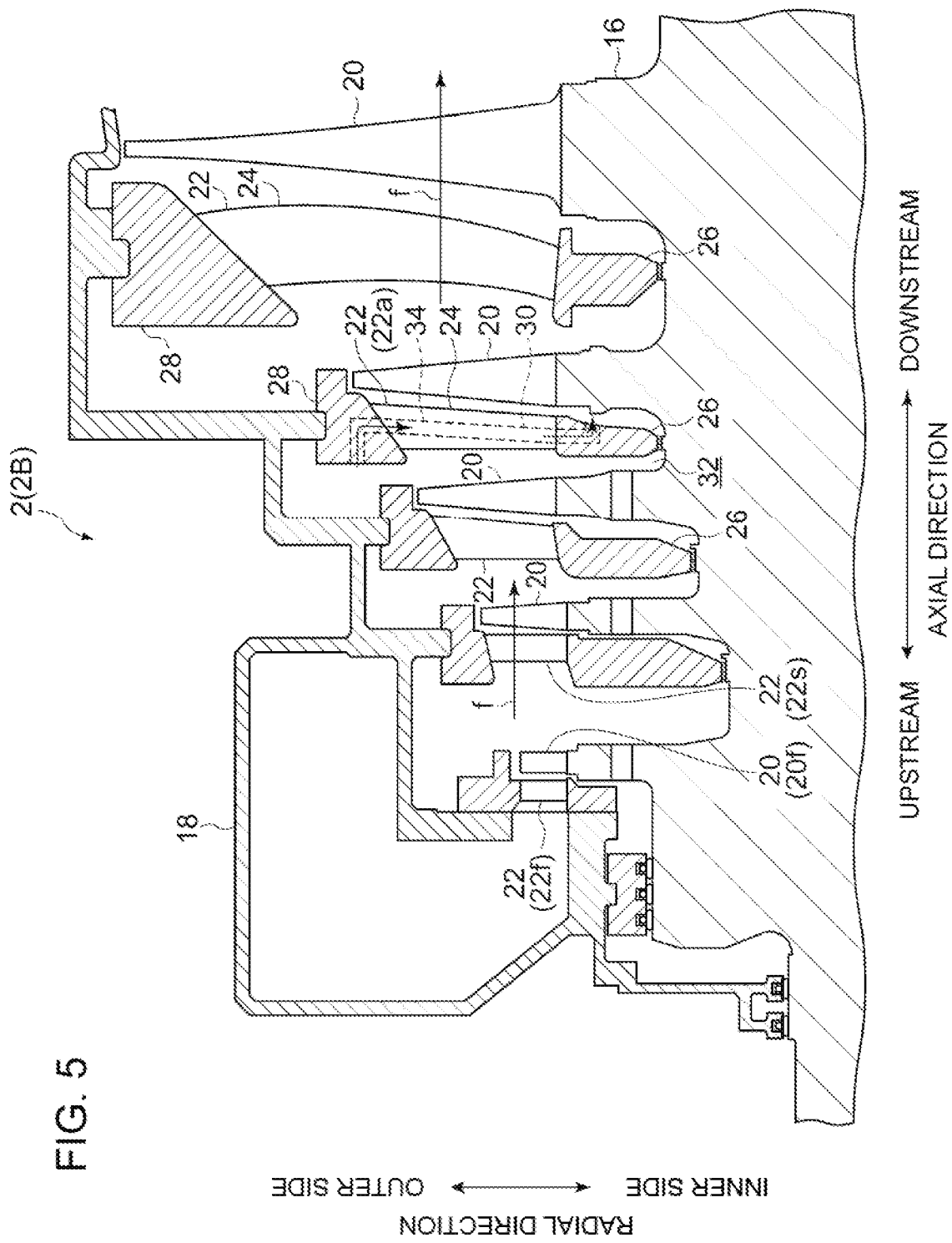
FIG. 5 is a cross-sectional view of a schematic configuration of the steam turbine device 2 (2B) according to an embodiment.
Figure 6:
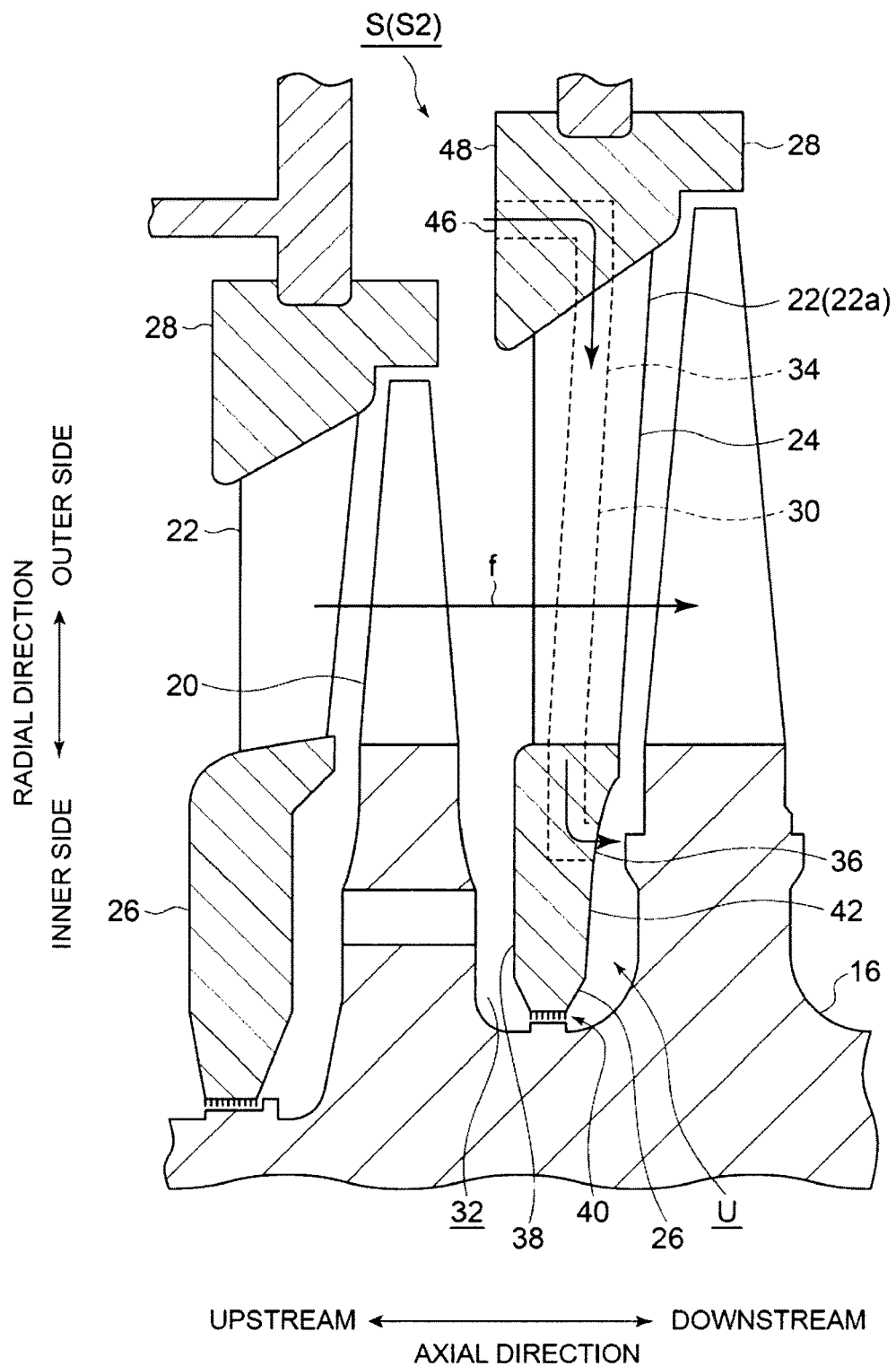
FIG. 6 is a partial enlarged view of the steam turbine device 2 (2B) depicted in FIG. 5.

FIG. 5 is a cross-sectional view of a schematic configuration of the steam turbine device 2 (2B) according to an embodiment. FIG. 6 is a partial enlarged view of the steam turbine device 2 (2B) depicted in FIG. 5. The basic configuration according to the steam turbine device 2 (2B) is similar to the basic configuration according to the steam turbine device 2 (2A), and the same reference numerals as the above mentioned reference numerals are affixed and the description is not repeated.

As depicted in FIG. 5, the steam turbine device 2 (2B) is different from the steam turbine device 2 (2A) in the specific configuration of the steam passage 34. As depicted in FIG. 6, the steam inlet 46 of the steam passage 34 is disposed on the upstream surface 48 of the outer race 28 of the first stationary vane 22a (surface upstream of the connection portion between the outer race 28 and the casing 18), and the steam outlet 36 of the steam passage 34 is disposed on the downstream surface 42 of the inner race 26 of the first stationary vane 22a. In the depicted embodiment, the inner race seal portion 40 having a labyrinth structure is disposed on the radially inner end of the inner race 26 of the first stationary vane 22a, and the steam outlet 36 of the steam passage 34 is disposed on the surface 42 downstream of the inner race seal portion 40 of the inner race 26.

With this configuration, there is a pressure difference across the inner race seal portion 40, and the pressure of the space U facing the surface 42 upstream of the outer race 28 of the first stationary vane 22a is higher than the pressure of the space S (S2) facing the downstream surface 48 in the inner race 26 of the first stationary vane 22a. Thus, even without using a pump or the like, it is possible to allow steam of the space S (S2) to flow through the through hole 30 of the first stationary vane 22a. Further, the temperature of steam extracted from the space S (S2) facing the upstream surface 42 of the outer race 28 of the first stationary vane 22a is higher than the temperature of the first stationary vane 22a, and thus it is possible to heat the first stationary vane 22a easily by allowing the extracted steam to flow through the through hole 30 of the first stationary vane 22a. Accordingly, it is possible to suppress generation of liquid drops on the surface of the first stationary vane 22a and suppress erosion through a simple configuration.

Further, as steam having passed through the through hole 30 of the first stationary vane 22a is discharged into the cavity 32 from the inner race 26 of the first stationary vane 22a, compared to the configuration of Patent Document 1 (where steam having passed through the inside of the stationary vane is discharged toward the tips of the rotor blades), it is possible to reduce loss due to interference between main flow 'f' flowing through the casing 18 (steam flow in the axial direction alternately passing through the stationary vane 22 and the rotor blade 20) and steam discharged through the through hole 30.

Further, it is possible to reduce leakage steam (leak flow from the mainstream) flowing into the cavity 32 from the upstream side of the first stationary vane 22a, it is possible to reduce loss due to the leakage steam.

Figure 7:
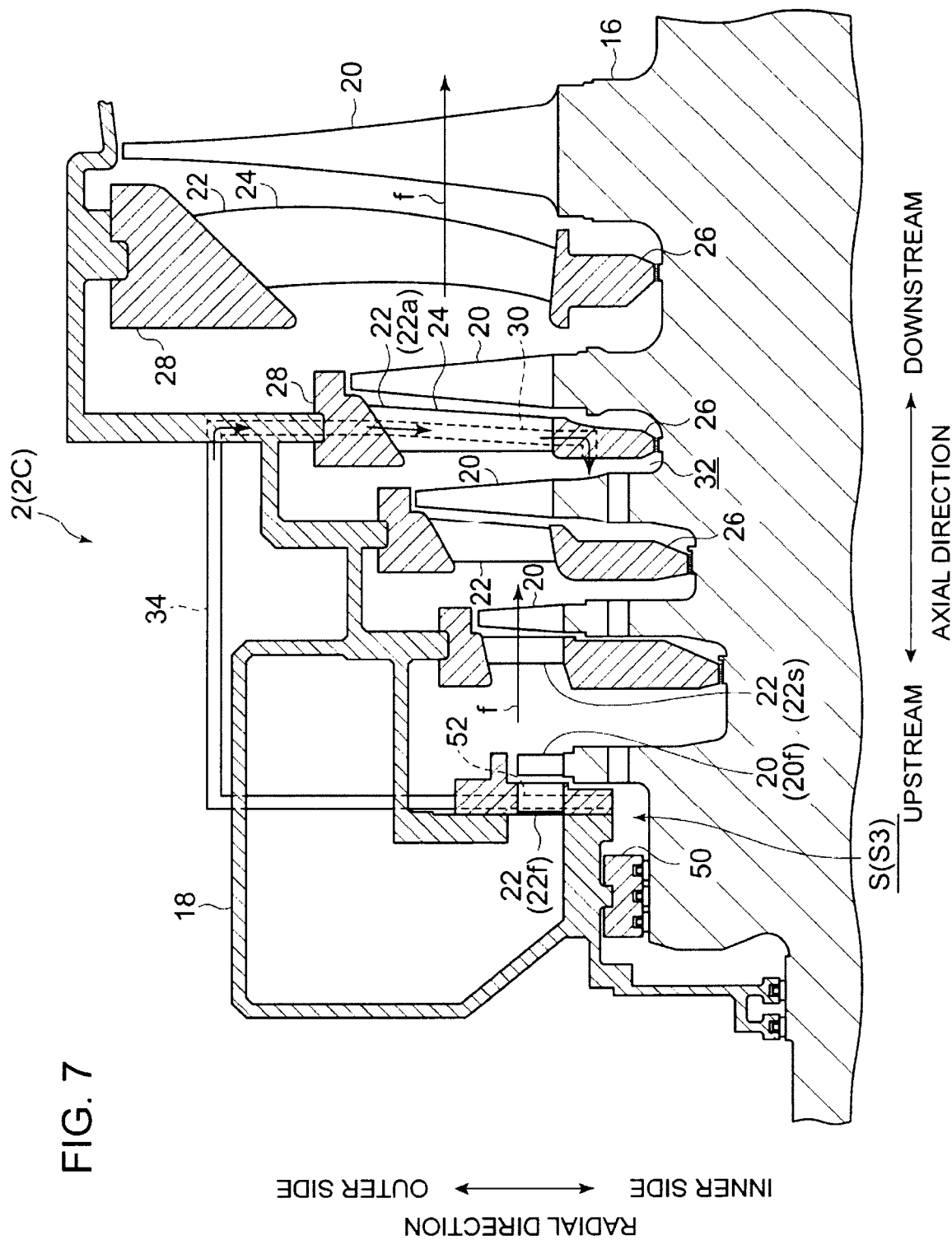
FIG. 7 is a cross-sectional view of a schematic configuration of the steam turbine device 2 (2C) according to an embodiment.
Figure 8:
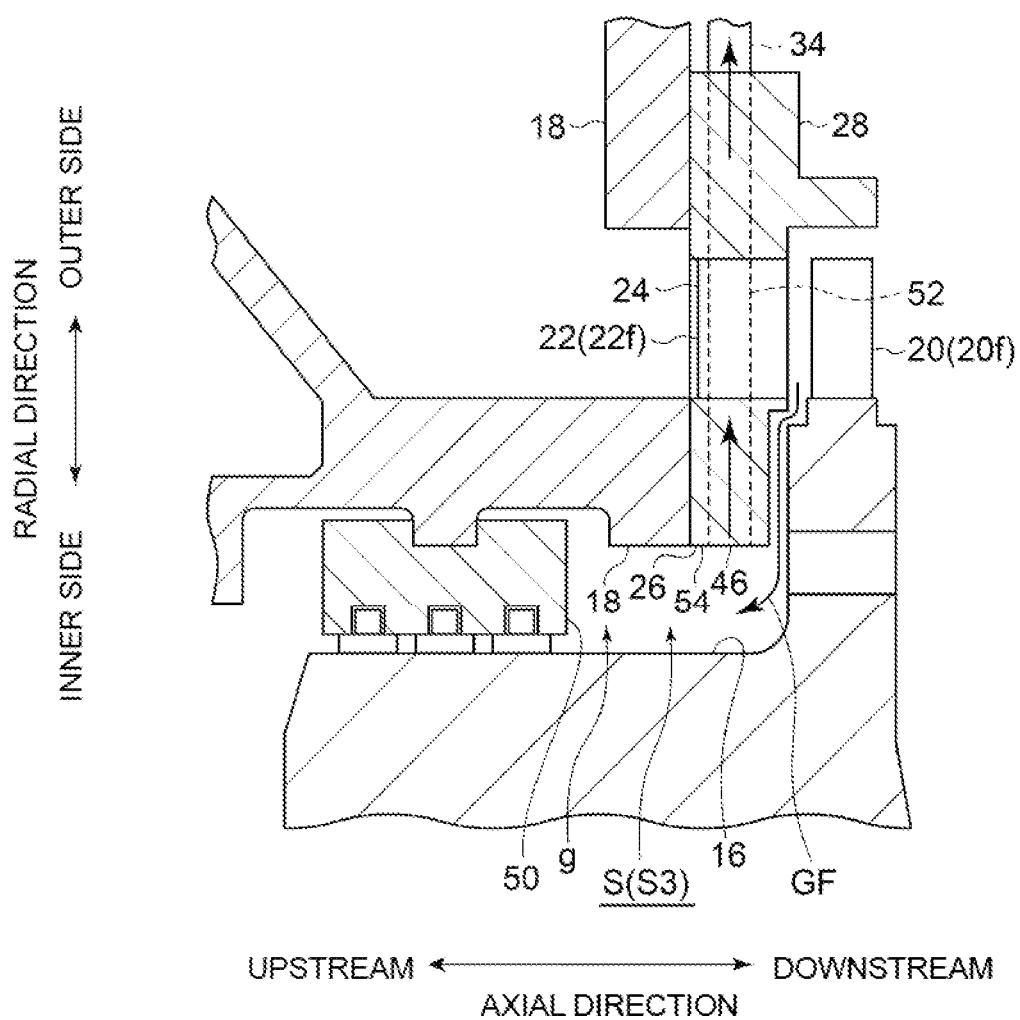
FIG. 8 is a partial enlarged view of the steam turbine device 2 (2C) depicted in FIG. 7.

FIG. 7 is a cross-sectional view of a schematic configuration of the steam turbine device 2 (2C) according to an embodiment. FIG. 8 is a partial enlarged view of the steam turbine device 2 (2C) depicted in FIG. 7. The basic configuration according to the steam turbine device 2 (2C) is similar to the basic configuration according to the steam turbine device 2 (2A, 2B), and the same reference numerals as the above mentioned reference numerals are affixed and the description is not repeated.

As depicted in FIGS. 7 and 8, the steam turbine device 2 (2C) is different from the steam turbine device 2 (2A, 2B) in the specific configuration of the steam passage 34. As depicted in FIG. 8, the steam turbine device 2 includes a seal portion 50 disposed in the gap 'g' between the rotor 16 and the casing 18 at the upstream of the first-stage rotor blade 20f in the axial direction, so as to seal leakage steam Gf flowing inward in the radial direction from the gap between the first-stage stationary vane 22f of the plurality of stationary vanes 22 and the first-stage rotor blade 20f of the plurality of rotor blades 20. The seal portion 50 has an annular structure, and forms a labyrinth structure between the inner peripheral surface of the seal portion 50 and the outer peripheral surface of the rotor 16.

In the steam turbine device 2 (2C), the first-stage stationary vane 22f includes a through hole 52 penetrating in the radial direction, and the steam inlet 46 of the steam passage 34 is disposed on the inner peripheral surface 54 of the inner race 26 of the first-stage stationary vane 22f so as to take in a part of leakage steam Gf.

As depicted in FIGS. 7 and 8, the steam passage 34 of the steam turbine device 2 (2C) is configured to supply the cavity 32 with a part of leakage steam Gf via the through hole 52 of the first-stage stationary vane 22f and the through hole 30 of the first stationary vane 22a.

Also with the above configuration, the temperature and pressure of leakage steam Gf extracted from the space S (S3) surrounded by the rotor 16 and the casing 18 at the upstream of the first-stage rotor blade 20f are higher than the temperature and pressure of steam inside the cavity 32, and higher than the temperature of the first stationary vane 22a. Thus, it is possible allow the leakage steam Gf to flow through the through hole 30 of the first stationary vane 22a without using a pump or the like, and heat the first stationary vane 22a easily. Accordingly, it is possible to suppress generation of liquid drops on the surface of the first stationary vane 22a and suppress erosion through a simple configuration.

Further, as steam having passed through the through hole 30 of the first stationary vane 22a is discharged into the cavity 32 from the inner race 26 of the first stationary vane 22a, compared to the configuration of Patent Document 1 (where steam having passed through the inside of the stationary vane is discharged toward the tips of the rotor blades), it is possible to reduce loss due to interference between main flow 'f' flowing through the casing 18 (steam flow in the axial direction alternately passing through the stationary vane 22 and the rotor blade 20) and steam discharged through the through hole 30.

Further, it is possible to reduce leakage steam (leak flow from the mainstream f) flowing into the cavity 32 from the upstream side of the first stationary vane 22a, and thus it is possible to reduce loss due to the leakage steam.

Embodiments of the present invention were described in detail above, but the present invention is not limited thereto, and various amendments and modifications may be implemented.

Figure 9:
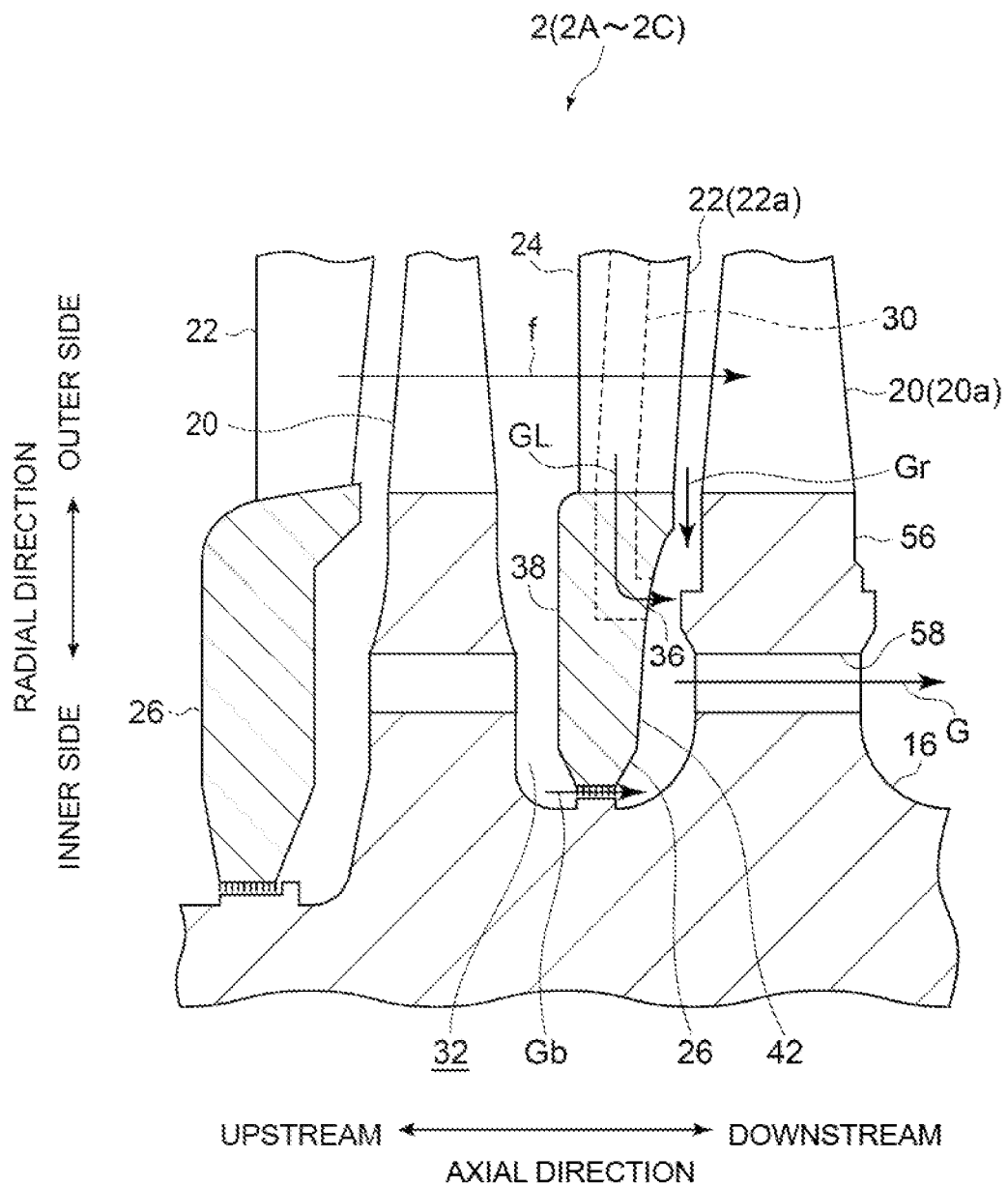
FIG. 9 is a cross-sectional view showing an embodiment where a first disc portion 56 has a balance hole 58.

For instance, as depicted in FIG. 9, in the above described steam turbine device 2 (2a to 2c), when the first rotor blade 20a is the rotor blade 20 disposed adjacent to and downstream of the first stationary vane 22a in the axial direction, of the plurality of rotor blades 20, and the first disc portion 56 is the disc portion to which the first rotor blade 20a is fixed, of the rotor 16, the first disc portion 56 may have a balance hole 58 formed through the first disc portion 56 in the axial direction. In this case, a part of steam GL discharged to the cavity 32 from the inner race 26 of the first stationary vane 22a through the through hole 30 of the first stationary vane 22a flows into the balance hole 58, from the upstream side in the axial direction. Steam having flowed into the balance hole 58 is discharged toward the downstream side of the first disc portion 56 through the inside of the first disc portion 56.

With the above configuration, the sum of the flow rate of the leakage steam Gb passing through the inner race seal portion 40 disposed on the radially inner end of the inner race 26, the flow rate of leakage steam Gr flowing into the cavity 32 from the gap between the first stationary vane 22a and the first rotor blade 20a at the downstream of the first stationary vane 22a, and the flow rate of heating steam GL discharged into the cavity 32 from the inner race 26 of the first stationary vane 22a is equal to the flow rate of steam G flowing through the balance hole 58. With this configuration, it is possible to reduce leak loss in the vicinity of the blade root portion of the first rotor blade 20a.

Further, providing the balance hole 58 for the final-stage rotor blade 20 in the steam turbine device 2 causes the exhaust loss to increase. Thus, it is preferable to provide the balance hole 58 for the first rotor blade 20a that is a rotor blade upstream of the final stage.

DESCRIPTION OF REFERENCE NUMERALS

1 Steam turbine plant
2 Steam turbine device
4 Boiler
6 Water supply pump
8a Steam supply pipe
8b Condensate supply pipe
8c Boiler-water supply pipe
10 Generator
12 Condenser
16 Rotor
18 Casing
20 Rotor blade
20a First rotor blade
20f First-stage rotor blade
22 Stationary vane
22a First stationary vane
22f First-stage stationary vane
22s Second-stage stationary vane
24 Vane body portion
26 Inner race
28 Outer race
30, 52 Through hole
32 Cavity
34 Steam passage
36 Steam outlet
38, 42, 48 Surface
40 Inner race seal portion
44 Tip section portion
46 Steam inlet
50 Seal portion
54 Inner peripheral surface
56 First disc portion
58 Balance hole

The invention claimed is:

1. A steam turbine, comprising:
a rotor;
a casing which houses the rotor;
a plurality of rotor blades disposed around the rotor;
a plurality of stationary vanes supported on the casing,
wherein each of the plurality of stationary vanes includes a vane body portion and an inner race positioned on an inner side of the vane body portion in a radial direction of the rotor,
wherein the plurality of stationary vanes include a first-stage stationary vane, a first stationary vane disposed on a downstream side of the first-stage stationary vane, and an intermediate stationary vane disposed on an upstream side of the first stationary vane and on a downstream side of the first-stage stationary vane, the first stationary vane having a through hole formed through the respective vane body portion in the radial direction,
wherein the rotor has a cavity having a concave shape and being formed such that at least a part of the inner race of the first stationary vane is housed in the cavity,
a steam passage is configured to extract steam after passing through the first-stage stationary vane from a space in the casing upstream of the first stationary vane and discharge the steam, via the through hole, from a steam outlet formed on the inner race to the cavity,
wherein each of the plurality of stationary vanes includes an outer race positioned on an outer side of the vane body portion in the radial direction of the rotor,
wherein an upstream space is defined by the outer race of the first stationary vane, the outer race of the intermediate stationary vane, and an inner surface of the casing,
wherein the upstream space is configured so that a steam flow passing across the intermediate stationary vane flows into the upstream space, and
wherein the steam passage has a steam inlet disposed on an upstream surface of the outer race of the first stationary vane.

2. The steam turbine according to claim 1,
wherein the first stationary vane is disposed in a region where a wetness fraction is not lower than 3%.

3. The steam turbine according to claim 2,
wherein the first stationary vane is disposed in a region where the wetness fraction is not lower than 10%.

4. The steam turbine according to claim 1,
the steam outlet is disposed on a downstream surface of the inner race of the first stationary vane.

5. The steam turbine according to claim 1,
wherein the plurality of rotor blades include a first rotor blade disposed adjacent to and downstream of the first stationary vane in an axial direction of the rotor, wherein the rotor includes a first disc portion to which the first rotor blade is fixed, wherein the first disc portion has a balance hole formed through the first disc portion in the axial direction of the rotor, and wherein the balance hole is configured such that a part of the steam discharged to the cavity from the inner race flows into the balance hole.

6. The steam turbine according to claim 1, wherein the steam outlet is disposed on an upstream surface of the inner race of the first stationary vane.

7. A steam turbine, comprising:

a rotor;

a casing which houses the rotor;

a plurality of rotor blades disposed around the rotor; and a plurality of stationary vanes supported on the casing, wherein each of the plurality of stationary vanes includes a vane body portion and an inner race positioned on an inner side of the respective vane body portion in a radial direction of the rotor, wherein the plurality of stationary vanes include a first stationary vane having a through hole formed through the respective vane body portion in the radial direction, wherein the rotor has a cavity having a concave shape and being formed such that at least a part of the inner race of the first stationary vane is housed in the cavity, a steam passage configured to extract steam from a space upstream of the first stationary vane and discharge the steam, via the through hole, from a steam outlet formed on the inner race of the first stationary vane to the cavity, wherein the steam turbine further comprises a seal portion disposed in a gap between the rotor and the casing so as to seal leakage steam that flows inward in the radial direction of the rotor from a gap between a first-stage stationary vane of the plurality of stationary vanes and a first-stage rotor blade of the plurality of rotor blades, wherein the first-stage stationary vane includes a through hole formed therethrough in the radial direction of the rotor, wherein a steam inlet of the steam passage is configured to take in a part of the leakage steam, and wherein the steam passage is configured to supply the part of the leakage steam into the cavity via the through hole of the first-stage stationary vane.

* * * * *